(12) United States Patent
Carter

(10) Patent No.: US 6,751,838 B1
(45) Date of Patent: Jun. 22, 2004

(54) COPPER PIPE COUPLER TOOL AND METHOD OF COUPLING

(75) Inventor: Sam W. Carter, West Branch, MI (US)

(73) Assignee: Carter, West Branch, MI (US)

( * ) Notice: Subject to any disclaimer, the term of this patent is extended or adjusted under 35 U.S.C. 154(b) by 173 days.

(21) Appl. No.: 10/176,823

(22) Filed: Jun. 21, 2002

(51) Int. Cl.$^7$ .............................. B23Q 3/00; B25B 27/14; B25B 27/10
(52) U.S. Cl. ................................ 29/464; 29/272; 81/9.3
(58) Field of Search .......................... 29/464, 237, 270, 29/271, 272; 81/9.3; 269/97, 43; 285/363, 81, 369, 345, 18, 23, 285, 365, 371, 417; 228/212

(56) References Cited

FOREIGN PATENT DOCUMENTS

ES          EP0341180       *   8/1989

* cited by examiner

*Primary Examiner*—John C. Hong
(74) *Attorney, Agent, or Firm*—Reising, Ethington, Barnes, Kisselle & Learman, P.C.

(57) ABSTRACT

The pipe coupler tool has a tool body with first and second ends and a tool body central axis. A first primary bore section is coaxial with the central axis and extends into the tool body from the first end. A second primary bore section is coaxial with the central axis and extends into the tool body from the second end. A secondary bore is coaxial with the central axis, extends axially from the first to the second primary sections and has a secondary bore diameter that is larger than the diameter of the first and second primary bore sections. First and second coupler end walls are provided at each end of the secondary bore section. A slot extending the length of the tool has sections with minimum widths that are slightly less than the diameter of the bore sections to which they are connected.

9 Claims, 3 Drawing Sheets

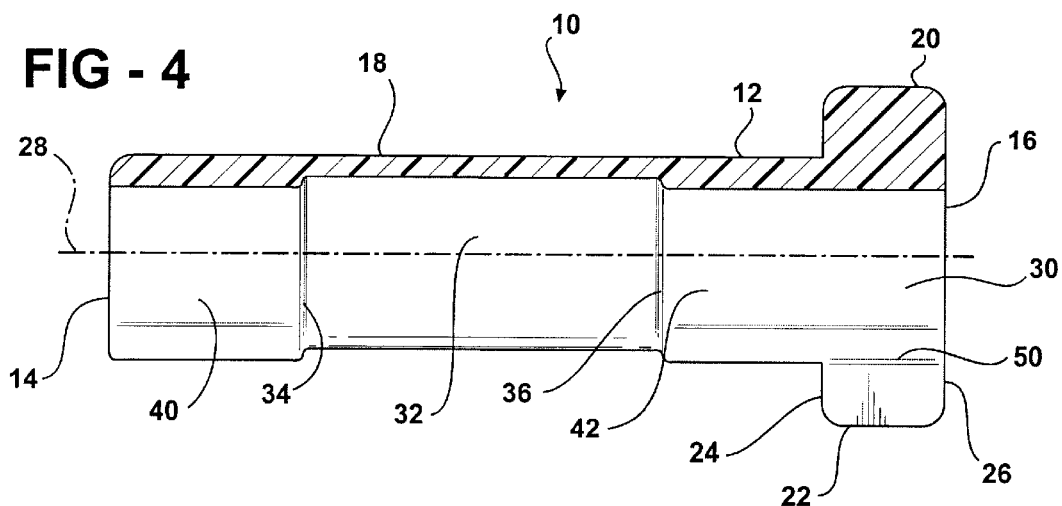
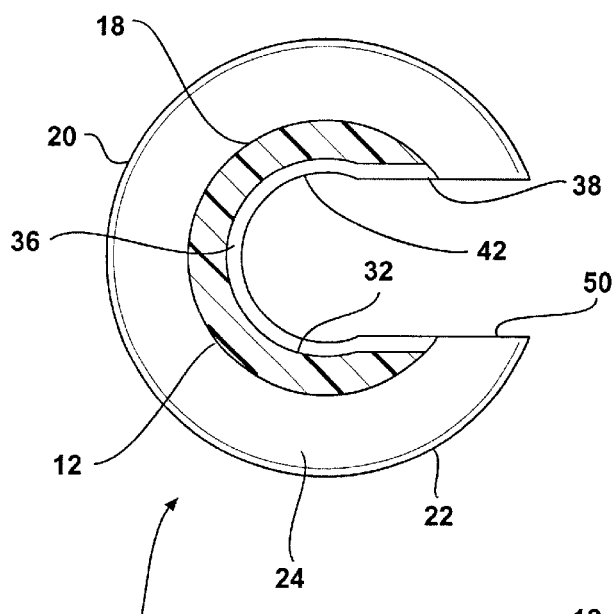
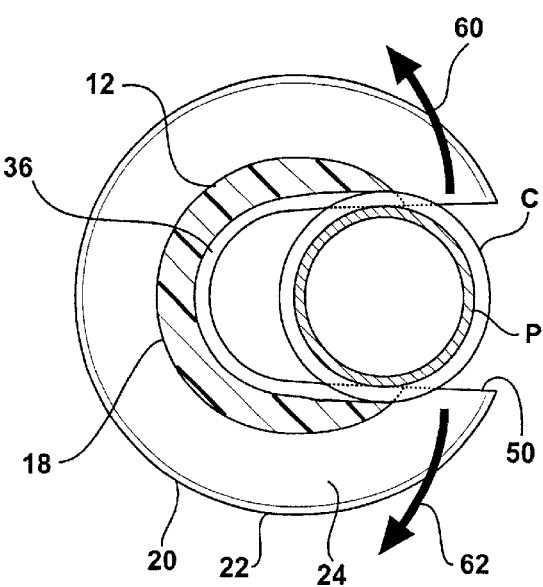

COPPER PIPE COUPLER TOOL AND METHOD OF COUPLING

FIELD OF THE INVENTION

The coupler tool aligns two copper pipe ends relative to each other and slides a coupler from one pipe to a position centered on two adjacent pipe ends in response to force manually applied to the tool.

BACKGROUND OF THE INVENTION

Two copper pipes in a piping system are installed by first cleaning the outside surfaces on both pipe ends and cleaning the inside surfaces of a pipe coupler. Flux is applied to the clean surfaces. The coupler is slid onto the cleaned end of one of the two pipes until a stop surface inside the pipe coupler contacts an end surface of the pipe and prevents further telescopic movement of the pipe coupler relative to the pipe. The cleaned end of the other pipe is then inserted into the free end of the pipe coupler until its end surface contacts the stop surface. The coupler and the pipe ends are then heated to a temperature sufficient to melt solder and solder is inserted into the voids between the outer surfaces of the pipes and inside surfaces of the pipe coupler to form a joint that does not leak. This procedure is relatively easy when a new pipe installation is being made and one of the two pipes has a free end thereby allowing one of the two pipes to be moved axially into the coupler.

Plumbers and pipe fitters frequently encounter situations when modifying or repairing a pipe system that requires coupling two ends of two pipes each of which has one end that is connected to other pipes and cannot be moved parallel to its long axis. The ends of the two pipes that need to be connected are often in a confined space such as between two floor joists or two wall studs. Such pipes are generally connected by moving the free ends of the pipes out of axial alignment with each other and sliding a pipe coupler, without an internal pipe stop, on one of the pipes until the pipe extends completely through the coupler and then moving the two pipe ends back into axial alignment with each other. Once the two adjacent pipe ends are in axial alignment, the coupler is moved axially to a position in which the coupler telescopically receives both pipes and the pipe end surfaces of both pipes are positioned substantially midway between the coupler ends. The coupler and the pipe ends are then heated and solder is inserted into the joints as explained above.

The process for connecting two pipe ends using a coupler without an internal pipe stop, as described above, appears to be relatively simple and straightforward. In practice it is difficult. The copper pipes, that are referred to as rigid copper pipes, have substantial spring in them and tend to return to an out of alignment unloaded position any time manual forces applied to align the pipe ends, are released. A plumbers helper is not always available to hold the pipe ends in alignment while the plumber attempts to slide the pipe coupler into place. The cut ends of pipes are deformed somewhat when the pipes are cut to length. Couplers are also frequently deformed somewhat during their production and handling. As a result of the deformation and friction, some force is generally required to slide a coupler into a position centered with the ends of two pipes after the two pipes are aligned with each other. Applying force to the coupler can damage the coupler.

SUMMARY OF THE INVENTION

The copper pipe coupler tool for positioning pipe couplers on adjacent ends of copper pipes includes a tool body having an outside surface, a first end and a second end. A tool body central axis passes through the first end and the second end. A first primary bore section, that is coaxial with the tool body central axis, extends into the tool body from the first end and has a first primary bore diameter that is substantially the same diameter as an outside diameter of pipes that are to be coupled. A second primary bore section, that is coaxial with the tool body central axis, extends into the tool body from the second end and has a second primary bore diameter that is substantially the same diameter as the outside diameter of pipes that are to be coupled. A secondary bore that is coaxial with the tool body central axis extends axially from the first primary bore section to the second primary bore section and has a secondary bore diameter that is substantially the same diameter as the outside diameter of pipe couplers with inside coupler bore diameters that are substantially the same diameter as the first primary bore diameter and the second primary bore diameter. A secondary bore first end wall, that is transverse to the tool body central axis, extends radially inward from the secondary bore to the first primary bore section and forms a first coupler end wall contact surface. A secondary bore second end wall that is transverse to the tool body central axis, extends radially inward from the secondary bore to the second primary bore section and forms a second coupler end wall contact surface. A slot in the tool body extends axially from the first end to the second end and includes a first slot portion that extends radially outward from the first primary bore section through the outside surface and has a first slot minimum width that is less than the first primary bore diameter, a second slot portion that extends radially outward from the second primary bore section through the outside surface and having a second slot minimum width that is less than the second primary bore diameter, and a central slot portion that extends radially outward from the second bore through the outside surface and having a central slot minimum width that is less than the secondary bore diameter. The tool body is made from a material with sufficient resilience to permit pipes that are to be coupled to pass through the central slot portion in response to manually applied force.

DESCRIPTION OF THE DRAWINGS

The presently preferred embodiment of the invention is disclosed in the following description and in the accompanying drawings, wherein:

FIG. 4 is a sectional view taken along line 4—4;

FIG. 5 is a sectional view taken along line 5—5 in FIG. 2; and

FIG. 6 is a view similar to FIG. 5 with the tool being forced onto pipes and a pipe coupler.

DETAILED DESCRIPTION OF THE PREFERRED EMBODIMENT

Figure 1:
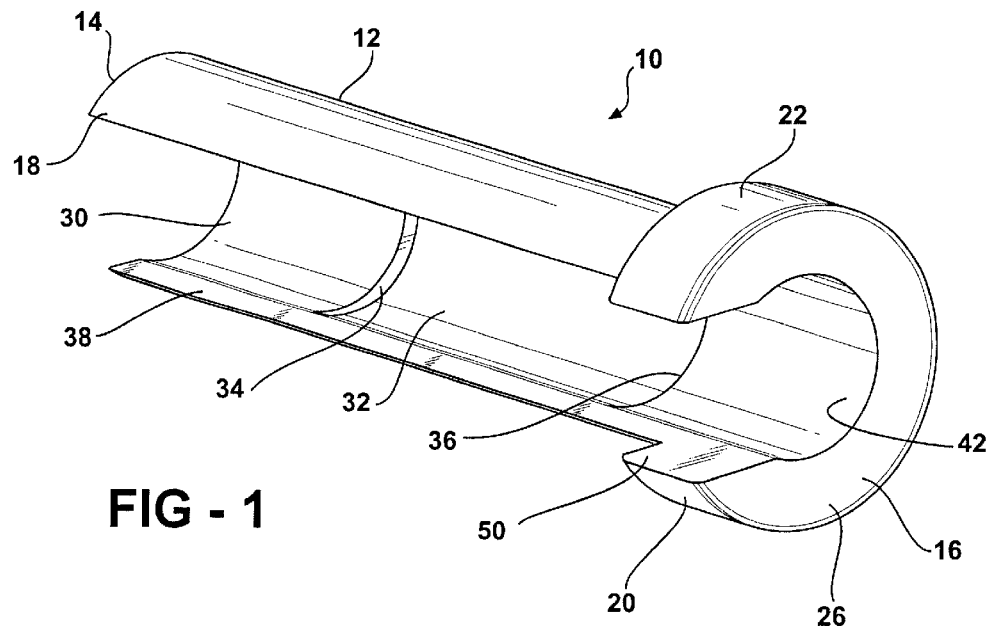
FIG. 1 is a perspective view of the copper pipe coupler tool.
Figure 2:
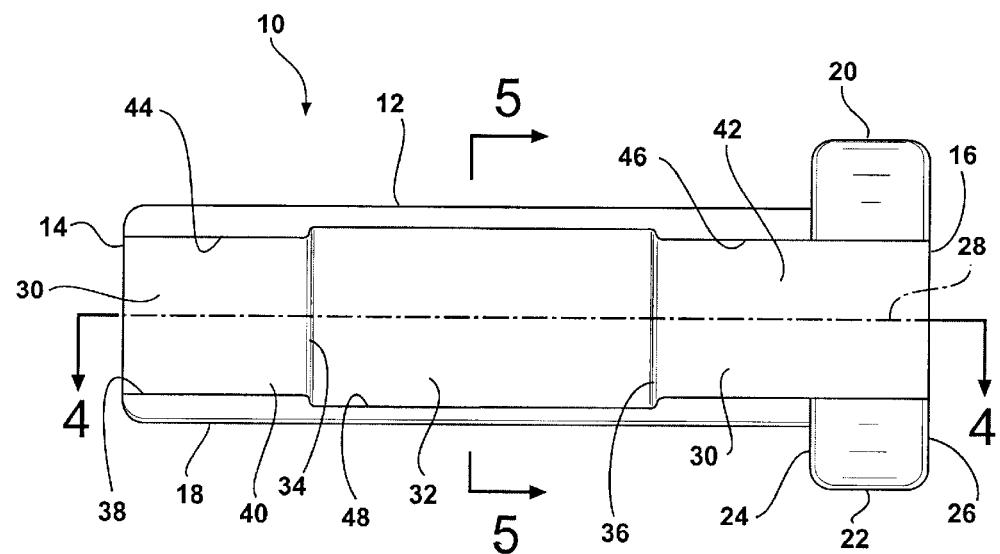
FIG. 2 is a side elevational view of the tool.

The tool 10 for moving a pipe coupler into position to sweat the joints is a generally channel shaped member. The tool has a main body 12 with a first end 14 and a second end 16. The outside surface 18 of the main body 12 is generally cylindrical as shown in the drawing. However, the shape of the outside surface 18 is generally unimportant. The outside surface 18 could be generally square or octagon shaped for example. A generally cylindrical flange 20 is provided on the second end 16 of the main body 12. The flange 20 has a generally cylindrical radially outward facing surface 22 and radially extending surfaces 24 and 26 that are in planes parallel to the end surfaces 14 and 16 and perpendicular to a central axis 28 of the main body 12. The flange 20 could be located any place along the central axis 28 between the first end 14 and the second end 16 of the main body 12.

A primary cylindrical bore 30 extends through the main body 12 from the first end 14 to the second end 16. The diameter of the primary bore 30 is substantially the same diameter as the outside diameter of the pipes P that are to be connected. The bore 30 is able to receive pipes P with a given nominal diameter. The pipes P fit snugly in the bore 30 while being slidable relative to the tool 10 along the central axis 28 of the primary bore with a minimal force.

A secondary bore 32 that is coaxial with the primary bore 30 and the central axis 28 is provided in a section of the main body 12 midway between the first end 14 and the second end 16. The secondary bore 32 has a diameter that is substantially the same as the outside diameter of pipe couplers C employed to connect two pipes P with a given nominal diameter. The axial length of the secondary bore 32 is about 0.25 inches longer than the axial length of the pipe couplers C that are to be used. The ends of the secondary bore 32 are radially extending walls 34 and 36 that extend radially inward from the wall of the secondary bore 32 to the walls of the primary bore 30.

The primary bore 30 is divided into a first primary bore section 40 and a second primary bore section 42. Each primary bore section 40 and 42 has an axial length that is about a third of the length of the main body 12. Alignment of the pipe ends would be a little more accurate if the length of the main body 12 was increased. However, increasing the length of the main body would eliminate the use of the tool in some confined spaces.

A slot 38 is provided in one side of the main body 12 and extends from the first end 14 to the second end 16. The slot also extends through the flange 20. The slot 38 has a first slot portion 44, a second slot portion 46 and a central slot portion 48. The first slot portion 44 intersects the first primary bore section 40. The second slot portion 46 intersects the second primary bore section 42. The central slot portion 48 extends from the first slot portion 44 to the second slot portion 46 and intersects the secondary bore 32. Both the first slot portion 44 and the second slot portion 46 have a width transverse to the central axis 28 that is less than the diameter of pipes P that are to be connected. The central slot portion 48 has a width transverse to the central axis 28 that is less than the diameter of the coupler C that is to connect the two pipes P. The main body 12 is preferably made from a polymer such as acetal with some resilience. Acetal resin sold under the name® Delrin by DuPont performs well. The width of the first, second and center slot portions 44, 46 and 48 permit the end portions of two pipes P and a coupler C to be forced manually through the slot 38 and into positions coaxial with the central axis 28. The force required to manually insert the pipes P and the coupler C through the slot 38 is preferably a few pounds and does not deform the pipes or the coupler.

The slot 38 also passes radially through the flange 20. The flange slot portion 50 that passes through the flange 20 preferably has a minimum width that is about the same size as the diameter of the pipe P or the coupler C depending upon the location of the flange along the central axis 28. Due to the size of the flange 20 and the increased rigidity that results from the flange, the minimum width of the slot portion 50 is increased slightly relative to other parts of the slot 38 to control the force required to force a pipe P or a coupler C through the slot portion.

Figure 3:
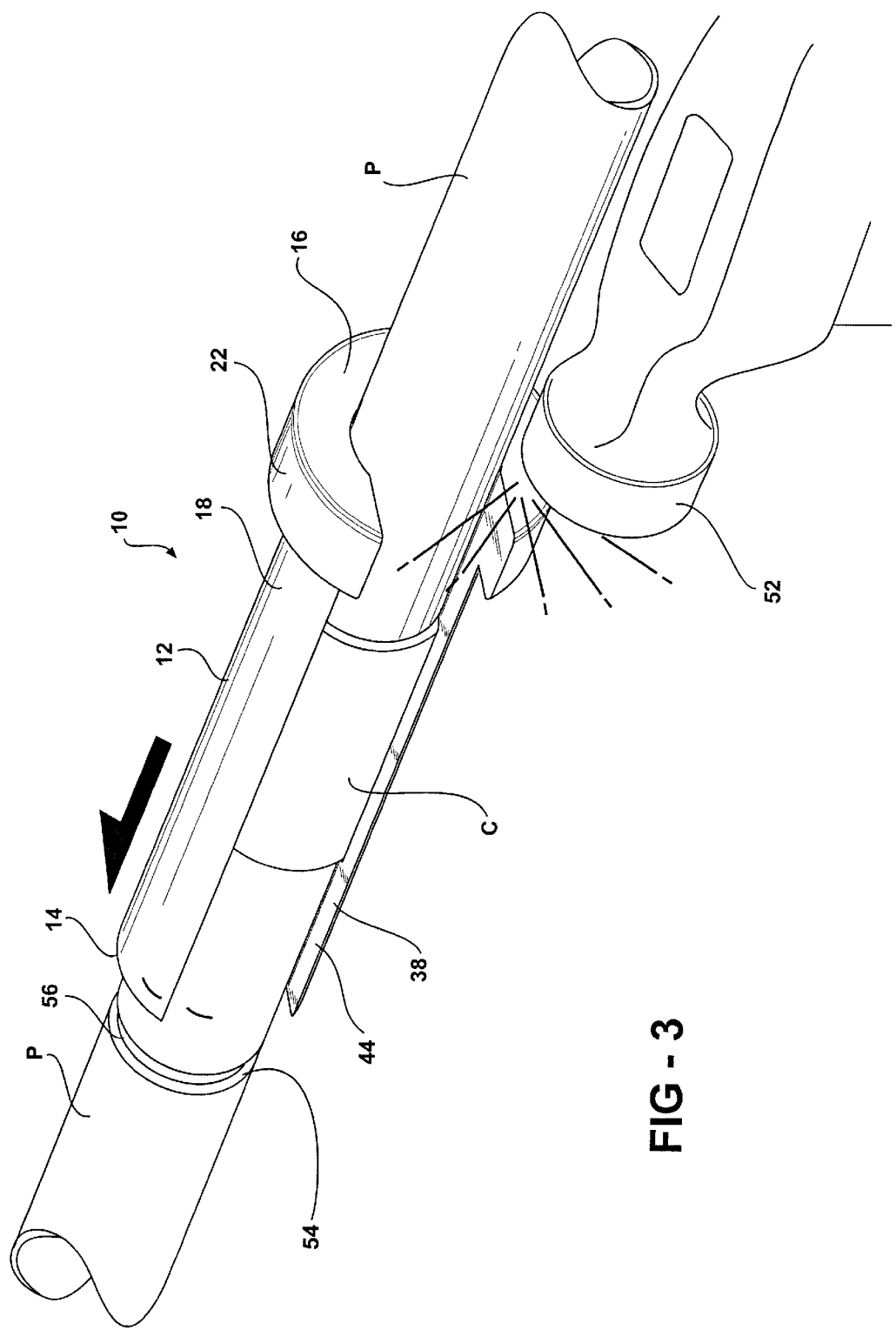
FIG. 3 is a perspective view of the tool, two pipes, a pipe coupler and a mallet with parts broken away.

During use of the tool 10, the adjacent end portions of two pipes P that are to be connected are cleaned. The inside of a coupler C without an internal pipe stop is also cleaned. Flux is applied to the cleaned surfaces. The ends 54 and 56 of two pipes P that are to be connected are moved out of axial alignment and the coupler C is slid onto one of the two pipes until the pipe extends substantially all the way through the coupler. The coupler C is slid much further onto the right pipe P, as shown in FIG. 3, than necessary for clarity. During use of the tool 10, the pipe coupler C would not be slid onto a pipe any farther than necessary. A mark can be placed on one of the pipes P to indicate the location of an end 14 or 16 of the tool 10 when the pipe ends 54 and 56 are centered in a pipe coupler C. Both pipes P and the coupler C are then forced through the slot 38 and into positions coaxial with the central axis 28 of the cylindrical bore 30 and the tool 10. The arrows 60 and 62 in FIG. 6 indicate the directions the tool 10 flexes to widen the slot 38 when the tool is forced into axial alignment with pipes P and couplers C or removed from pipes and couplers. The first primary bore section 40 and the second primary bore section 42 hold the adjacent ends of two pipes P in axial alignment with each other. The secondary bore 32 holds the coupler C in a position coaxial with adjacent ends of both pipes P. The tool 10 is then moved axially along the axis 28 until one of the radially extending walls 34 or 36 contact an end of the coupler C and move the coupler partially off of one pipe P and into telescopic engagement with the other pipe. Substantial force may be required to slide the coupler C along the axis 28, partially off of one pipe and telescopically onto an adjacent pipe. Force can be applied to ends 14 or 16 of the main body 12 or to the flange 20. Force can be applied directly by grasping the tool by hand or by a lever arm or by striking the tool directly or indirectly with a mallet 52. When adjacent ends of two pipes P are substantially centered with the coupler C, the tool 10 is manually moved radially from the pipes and the coupler. Heat and solder are then applied to form a connection between the coupler C and the two pipes P that does not leak.

The flange 20 is easy to grasp manually to move the tool 10 and the coupler C. However, the flange 20 is not necessarily required. Force can also be applied to the end surfaces 14 or 16 of the body 12 as stated above and the flange 20 can be eliminated.

A tool 10 is required for each size pipe that is to be connected. A tool 10 made for connecting ¾ inch pipe cannot be used for ½ inch pipe for example. A ½ inch tool 10 will be required for ½ inch diameter pipe connections.

The disclosed embodiment is representative of a presently preferred form of the invention, but is intended to be illustrative rather than definitive thereof. The invention is defined in the claims.

I claim:

1. A copper pipe coupler tool for positioning pipe couplers on adjacent ends of copper pipes comprising:
   a tool body having an outside surface, a first end and a second end;
   a tool body central axis passing through the first end and the second end;
   a first primary bore section, that is coaxial with the tool body central axis, extends into the tool body from the first end, and has a first primary bore diameter that is substantially the same diameter as an outside diameter of pipes that are to be coupled;

a second primary bore section, that is coaxial with the tool body central axis, extends into the tool body from the second end, and has a second primary bore diameter that is substantially the same diameter as the outside diameter of pipes that are to be coupled;

a secondary bore, that is coaxial with the tool body central axis, extends axially from the first primary bore section to the second primary bore section, and has a secondary bore diameter that is substantially the same diameter as the outside diameter of pipe couplers with inside coupler bore diameters that are substantially the same diameter as the first primary bore diameter and the second primary bore diameter;

a secondary bore first end wall that is transverse to the tool body central axis, extends radially inward from the secondary bore to the first primary bore section, and forms a first coupler end wall contact surface;

a secondary bore second end wall that is transverse to the tool body central axis, extends radially inward from the secondary bore to the second primary bore section, and forms a second coupler end wall contact surface;

a slot in the tool body extending axially from the first end to the second end and including a first slot portion that extends radially outward from the first primary bore section through the outside surface and having a first slot minimum width that is less than the first primary bore diameter, a second slot portion that extends radially outward from the second primary bore section through the outside surface and having a second slot minimum width that is less than the second primary bore diameter, and a central slot portion that extends radially outward from the secondary bore through the outside surface and having a central slot minimum width that is less than the secondary bore diameter; and wherein the tool body is made from a material with sufficient resilience to permit pipes that are to be coupled to pass through the first and second slot portions and couplers to pass through the central slot portion in response to manually applied force.

2. A copper pipe coupler tool for positioning pipe couplers on adjacent ends of copper pipes, as set forth in claim 1, including a flange on the tool body that extends radially outward from the outside surface of the tool body;

radially extending surfaces on the flange for receiving forces to move the tool body along the tool body central axis; and a flange slot in the flange in radial alignment with the slot in the tool body.

3. A copper pipe coupler tool for positioning pipe couplers on adjacent ends of copper pipes, as set forth in claim 2, wherein the flange on the tool body is adjacent to the second end of the tool body.

4. A copper pipe coupler tool for positioning pipe couplers on adjacent ends of copper pipes, as set forth in claim 1, wherein the tool body is a polymer.

5. A copper pipe coupler tool for positioning pipe couplers on adjacent ends of copper pipes, as set forth in claim 4, wherein the polymer is acetal.

6. A copper pipe coupler tool for positioning pipe couplers on adjacent ends of copper pipes, as set forth in claim 2, wherein the distance between the secondary bore first end wall and the secondary bore second end wall exceeds an axial length of pipe couplers that are to be positioned by the copper pipe coupler tool.

7. A copper pipe coupler tool for positioning pipe couplers on adjacent ends of copper pipes, as set forth in claim 6, wherein the distance between the secondary bore first end wall and the secondary bore second end wall exceeds the axial length of pipe couplers that are to be positioned by not more than 0.25 inches.

8. A copper pipe coupler tool for positioning pipe couplers on adjacent ends of copper pipes comprising:

a tool body having an outside surface, a first end and a second end;

a tool body central axis passing through the first end and the second end;

a first primary bore section, that is coaxial with the tool body central axis, extends into the tool body from the first end, and has a first primary bore diameter that is substantially the same diameter as an outside diameter of pipes that are to be coupled;

a second primary bore section, that is coaxial with the tool body central axis, extends into the tool body from the second end, and has a second primary bore diameter that is substantially the same diameter as the outside diameter of pipes that are to be coupled;

a secondary bore, that is coaxial with the tool body central axis, extends axially from the first primary bore section to the second primary bore section, and has a secondary bore diameter that is substantially the same diameter as the outside diameter of pipe couplers with inside coupler bore diameters that are substantially the same diameter as the first primary bore diameter and the second primary bore diameter;

a secondary bore first end wall that is transverse to the tool body central axis, extends radially inward from the secondary bore to the first primary bore section, and forms a first coupler end wall contact surface;

a secondary bore second end wall that is transverse to the tool body central axis, extends radially inward from the secondary bore to the second primary bore section, and forms a second coupler end wall contact surface;

a flange on the tool body that extends radially outward from the outside surface of the tool body;

radially extending surfaces on the flange for receiving forces to move the tool body along the tool body central axis;

a slot in the tool body extending axially from the first end to the second end and including a first slot portion that extends radially outward from the first primary bore section through the outside surface and having a first slot minimum width that is less than the first primary bore diameter, a second slot portion that extends radially outward from the second primary bore section through the outside surface and having a second slot minimum width that is less than the second primary bore diameter, and a central slot portion that extends radially outward from the secondary bore through the outside surface and having a central slot minimum width that is less than the secondary bore diameter; and wherein the tool body is made from a material with sufficient resilience to permit pipes that are to be coupled to pass through the first and second slot portions and couplers to pass through the central slot portion in response to manually applied force.

9. A method of coupling two pipes together with a pipe coupler tool comprising:

aligning a pipe coupler, on a first end portion of a first pipe end, with a central slot and a secondary bore in said pipe coupler tool;

forcing the pipe coupler through the central slot portion and into the secondary bore;

forcing the first end portion of the first pipe end into a second primary bore in said pipe coupler tool;

insert a second end portion of a second pipe end into a first primary bore in said pipe coupler tool;

holding the first end portion of the first pipe end, the second end portion of the second pipe end, and the pipe coupler in positions coaxial with a central axis of the second primary bore, of the secondary bore, and of the first primary bore in said pipe coupler tool;

sliding said pipe coupler tool and the pipe coupler along the central axis until the first end portion of the first pipe end and the second end portion of the second pipe end are both encased in the pipe coupler; and removing the pipe coupler from said pipe coupler tool.

* * * * *